United States Patent
Archer

(10) Patent No.: US 10,506,099 B2
(45) Date of Patent: *Dec. 10, 2019

(54) PROCESSING SMS MESSAGES

(71) Applicant: Metaswitch Networks Ltd., Enfield (GB)

(72) Inventor: Duncan Archer, Durham (GB)

(73) Assignee: Metaswitch Networks Ltd., Enfield (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/240,611

(22) Filed: Jan. 4, 2019

(65) Prior Publication Data

US 2019/0230221 A1  Jul. 25, 2019

(30) Foreign Application Priority Data

Jan. 23, 2018  (GB) .................................. 1801120.5

(51) Int. Cl.
*H04M 3/42* (2006.01)
*H04W 4/14* (2009.01)
(Continued)

(52) U.S. Cl.
CPC ........ *H04M 3/42246* (2013.01); *H04L 51/22* (2013.01); *H04L 51/28* (2013.01);
(Continued)

(58) Field of Classification Search
CPC ......... H04L 67/02; H04L 67/42; H04L 29/06; H04L 29/12122; H04L 51/38;
(Continued)

(56) References Cited

U.S. PATENT DOCUMENTS

2002/0013815 A1  1/2002  Obradovich et al.
2009/0061825 A1  3/2009  Neelakantan et al.
(Continued)

FOREIGN PATENT DOCUMENTS

| EP | 2637429 A1 | 9/2013 |
| WO | 2004086784 A1 | 10/2004 |
| WO | 2008088890 A1 | 7/2008 |

OTHER PUBLICATIONS

Combined Search and Examination Report dated Mar. 8, 2018 for GB Application No. GB 1801120.5.
(Continued)

*Primary Examiner* — George Eng
*Assistant Examiner* — Jing Gao
(74) *Attorney, Agent, or Firm* — EIP US LLP

(57) ABSTRACT

There is provided a method for processing communications in a telephony network. The method includes configuring a first telephony identifier for communication with a first user and a second user, and a second telephony identity for communication with the second user, each of the telephony identifiers being configured for use as different destination addresses in different SMS messages sent to the second user. The method includes processing at least one SMS message in SMS processing equipment in the network, and during this processing, performing identity management, in relation to the use of the first and second telephony identifiers for the second user.

18 Claims, 2 Drawing Sheets

(51) Int. Cl.
*H04W 4/20* (2018.01)
*H04L 12/58* (2006.01)
*H04M 7/00* (2006.01)
*H04W 88/18* (2009.01)
*H04W 88/16* (2009.01)

(52) U.S. Cl.
CPC .......... *H04L 51/36* (2013.01); *H04M 7/0081* (2013.01); *H04W 4/14* (2013.01); *H04W 4/20* (2013.01); *H04W 88/184* (2013.01); *H04W 88/16* (2013.01)

(58) Field of Classification Search
CPC ............. H04L 61/1547; H04L 65/1016; H04L 65/1069; H04L 67/306; H04L 69/08; H04L 29/06027; H04L 29/12047; H04L 61/15; H04L 61/2069; H04L 65/1006; H04L 65/102; H04L 65/1066; H04L 65/602; H04L 65/604; H04L 67/10; H04L 67/303; H04L 51/22; H04L 51/28; H04L 51/36; H04M 15/8033; H04M 15/8066; H04M 15/8072; H04M 15/8077; H04M 7/0075; H04M 3/42246; H04M 7/0081; H04W 4/08; H04W 4/24; H04W 8/18; H04W 28/12; H04W 76/11; H04W 76/40; H04W 84/12; H04W 88/16; H04W 4/14
See application file for complete search history.

(56) References Cited

U.S. PATENT DOCUMENTS

| | | |
|---|---|---|
| 2011/0317684 A1 | 12/2011 | Lazzaro et al. |
| 2011/0319057 A1* | 12/2011 | Toebes .............. H04M 3/42374 455/414.1 |
| 2012/0033610 A1* | 2/2012 | Ring .................... H04L 67/141 370/328 |
| 2015/0172884 A1 | 6/2015 | Arazi et al. |
| 2017/0339538 A1* | 11/2017 | Yang ....................... H04W 4/14 |

OTHER PUBLICATIONS

Response to Examination Report dated May 18, 2018 for GB Application No. GB 1801120.5.
No Further Objections dated May 24, 2018 for for GB Application No. GB 1801120.5.
Extended Search Report dated Mar. 25, 2019 for European Application No. EP19152240.8.

* cited by examiner

PROCESSING SMS MESSAGES

CROSS-REFERENCE TO RELATED APPLICATIONS

This application claims priority to GB Application No. GB 1801120.5 filed 23 Jan. 2018, under 35 U.S.C. § 119(a). Each of the above-referenced patent applications is incorporated by reference in its entirety.

BACKGROUND OF THE INVENTION

Field of the Invention

The present disclosure relates to processing Short Message Service (SMS) messages in a telephony network. In particular, but not exclusively, the present disclosure relates to methods, apparatuses and computer programs for use in processing SMS messages.

Description of the Related Technology

Users of a telephony network may wish to conduct messaging as a group. A user may have an identity for group messaging use. There may be scenarios in which the user wishes to conduct messaging in relation to both personal matters and group matters using a single user device, for example so that the user need not carry both a personal messaging user device and a group messaging user device. Some telephony network operators are evolving their networks to GSMA Rich Communication Services (RCS), which provides a Common Message Store (CMS) which can be accessed from multiple devices for the same identity, and uses the native cellular network. However, this requires compatible smartphone devices capable of supporting the RCS protocol, which is based on the Session Initial Protocol (SIP) and on Long Term Evolution (LTE) or later networking technology. Therefore, this solution is not available to users of so-called feature phones, nor to users which are currently attached via their devices to a second generation (2G) network such as a GSM network or third generation (3G) networks such as a UMTS network.

Users of messaging apps, for example Facebook™ and Whatsapp™, can access group messaging services, with messages to a group delivered to the same app used for personal messaging on a user device, and allowing selection of a group to use when sending messages. However, such apps use various proprietary protocols which are not well integrated with the protocols and functionality of a cellular telephone network. Such apps also operate as "walled gardens" and thus only those that use the app can message others, and in turn this requires use of a smartphone in order to access the service. Users of feature phones do not get access to such messaging services. Furthermore, users require mobile data or WiFi™ connections to be active to send and receive messages.

SUMMARY

According to an aspect of the present invention, there is provided a method for processing communications in a telephony network, the method comprising:
configuring a first telephony identifier for communication with a first user and a second user, and a second telephony identity for communication with the second user, each of the first and second telephony identifiers being configured for use as different destination addresses in different SMS messages sent to the second user; and
processing at least one SMS message in SMS processing equipment in the network; and
performing identity management, in relation to the use of the first and second telephony identifiers for the second user, during processing of the at least one SMS message at the SMS processing equipment.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

A telephony network (also referred to as a 'telephone network') is a type of telecommunications network in which telephony services including voice calls (also referred to as 'telephone calls' or 'calls'), video calls and messaging services can be provided and such telephony services can be conducted between two or more users of the telephony network. Such users may be known as 'entities', 'parties', 'subscribers' or 'end users'.

Figure 1:
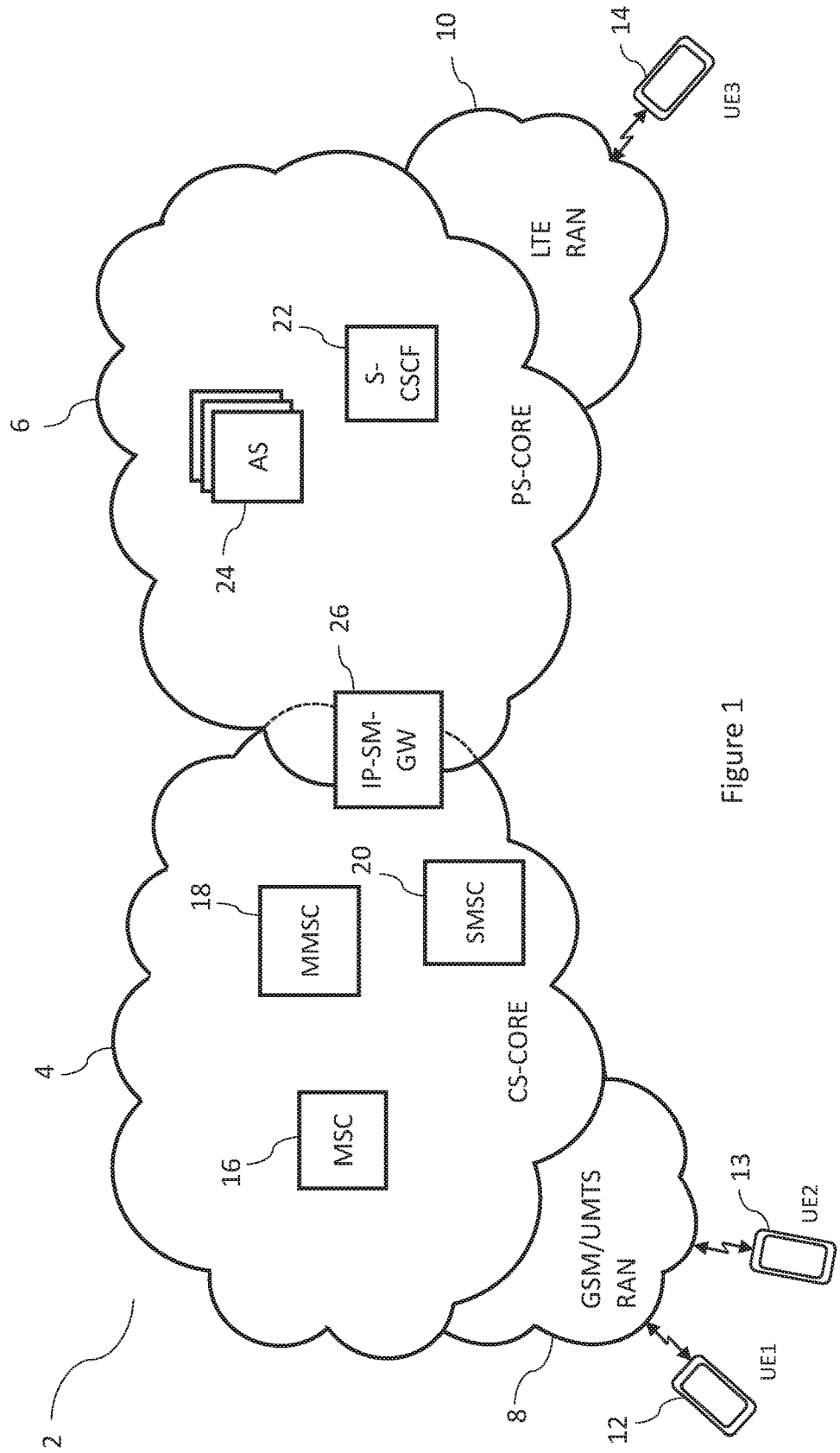
FIG. 1 shows a schematic block diagram representing an example of a telephony network.

In the example shown in FIG. 1, the telephony network 2 is a cellular telephony network which comprises a Circuit-Switched (CS) core network 4, a Packet-Switched (PS) core network 6, a Universal Mobile Telecommunications System (UMTS) Radio Access Network (RAN) 8 and a Long-Term Evolution (LTE) RAN 10. Users can communicate by means of apparatus in the form of user equipment connected via any of the radio access networks to the CS core network 4 and/or the PS core network 6. FIG. 1 shows first user equipment 12, second user equipment 13, and third user equipment 14, which may for example be smartphone devices and/or feature phone devices, and network-based telephony equipment. The network-based telephony equipment may be implemented on a given physical computing device or devices, and/or may be virtualised across a platform of computing devices. In this example, the CS core network 4 includes telephony equipment including a Mobile Switching Center (MSC) 16, a Multimedia Messaging Switch Center (MMSC) 18 and a Short Message Switching Centre (SMSC) 20, connected via signalling links, not shown in FIG. 1, in the CS core network 4. The PS core network 6 includes telephony equipment in the form of a Serving-Call Session Control Function (S-CSCF) 22, and one or more Application Servers (AS) 24. The telephony network 2 further comprises gateway equipment in the form of an Internet Protocol Short Message Gateway (IP-SM-GW) 26, which is communicatively connected to telephony equipment within the CS-core network 4 and the PS-core network 6. The telephony network 2 in this example transmits messages between two or more users of the telephony network, including SMS messages and other message types such as Multimedia service (MMS) messages. The SMSC 20 and the IP-SM-GW 26 are examples of SMS processing equipment. It will be appreciated that, in reality, a telephony network may comprise more user equipment and/or more telephony network equipment than in the example telephony network 2. Further, the telephony network may be connected to other cellular telephony networks, in which the user terminals may also access the messaging services described herein, and the public switched telephone network (PSTN).

The IP-SM-GW 26 may be SMS processing equipment which operates according to the 3GPP standards, inter alia 3GPP TS 24.341. The IP-SM-GW may implement transport-layer interworking for SMS messages transmitted between the CS core 4 and the PS core 6, for example according to the GSMA IR.92 version 9.0 specification. In this example, the IP-SM-GW 26 is a Metaswitch® Sentinel IP-SM-GW.

In this example, the PS core network 6 is an Internet Protocol Multimedia Subsystem (IMS) core network.

The first, second, and third user equipment 12, 13, 14 and/or the SMS processing equipment may comprise one or more processors and one or more memories. One or more computer programs comprising computer-readable instructions may be stored in the one or more memories. The one or more processors may be configured to execute the computer-readable instructions and perform at least some of the methods and techniques described herein as result.

In the examples described herein, the first and second user equipment 12, 13 are both user equipment (also referred to as 'endpoints', 'endpoint devices' and 'subscriber devices'), it being understood that some or all of the first, second or third user equipment 12, 13, 14 may not be user devices. An example of a user equipment that is not a user device is a voicemail server. User equipment are used by users of the telephony network and may take various different forms. Examples of user equipment include, but are not limited to, mobile (also referred to as 'cellular') telephones, including smartphones and feature phones, tablet computing devices, laptop computing devices, desktop computing devices, in-vehicle entertainment systems and smart watches. In this example, the first user equipment 12 is associated with a first user, the second user equipment 13 is associated with a second, different user, and the third user equipment 14 is associated with a third, further different user. In other examples, at least two of the first, second and third user equipment 12, 13, 14 are associated with the same user.

In this example, the user of the first user equipment 12 and the user of the second user equipment 13 are associated with a shared identity. There may be further user equipment associated with the shared identity. The shared identity is associated with a telephony service provider. A telephony service provider provides a telephony service to the first, second and third user. Examples of telephony service providers include, but are not limited to, mobile network operators (MNOs) and virtual mobile network operators (VMNOs).

Examples of telephony identifiers include, but are not limited to, telephone numbers, telephony service usernames and Session Initiation Protocol (SIP) Uniform Resource Indicators (URIs). The first and second accounts may be associated with the same type of telephony service, or may be associated with different types of telephony services. Examples of such telephony services include, but are not limited to, landline telephony services, mobile telephony services, mobile Voice over Internet Protocol (VoIP) telephony services and non-mobile VoIP telephony services.

The first user equipment 12 is associated with a first telephony identifier $ID_A$. The second user equipment 13 is associated with the first telephony identifier $ID_A$ and a second telephony identifier $ID_B$. The third user equipment 14 is associated with a third telephony identifier $ID_C$. In this example, the first, second and third telephony identifiers $ID_A$, $ID_B$ and $ID_C$ are Mobile Station International Subscriber Directory Numbers (MSISDNs). In other examples, other forms of telephony identifier may be used. Whilst two of the devices are shown connected via the CS core network 4 and another is shown connected via the PS core network 6, any of them may be connected via either network and may dynamically change the radio access they use depending on coverage in a current location of each respective user.

Figure 2:
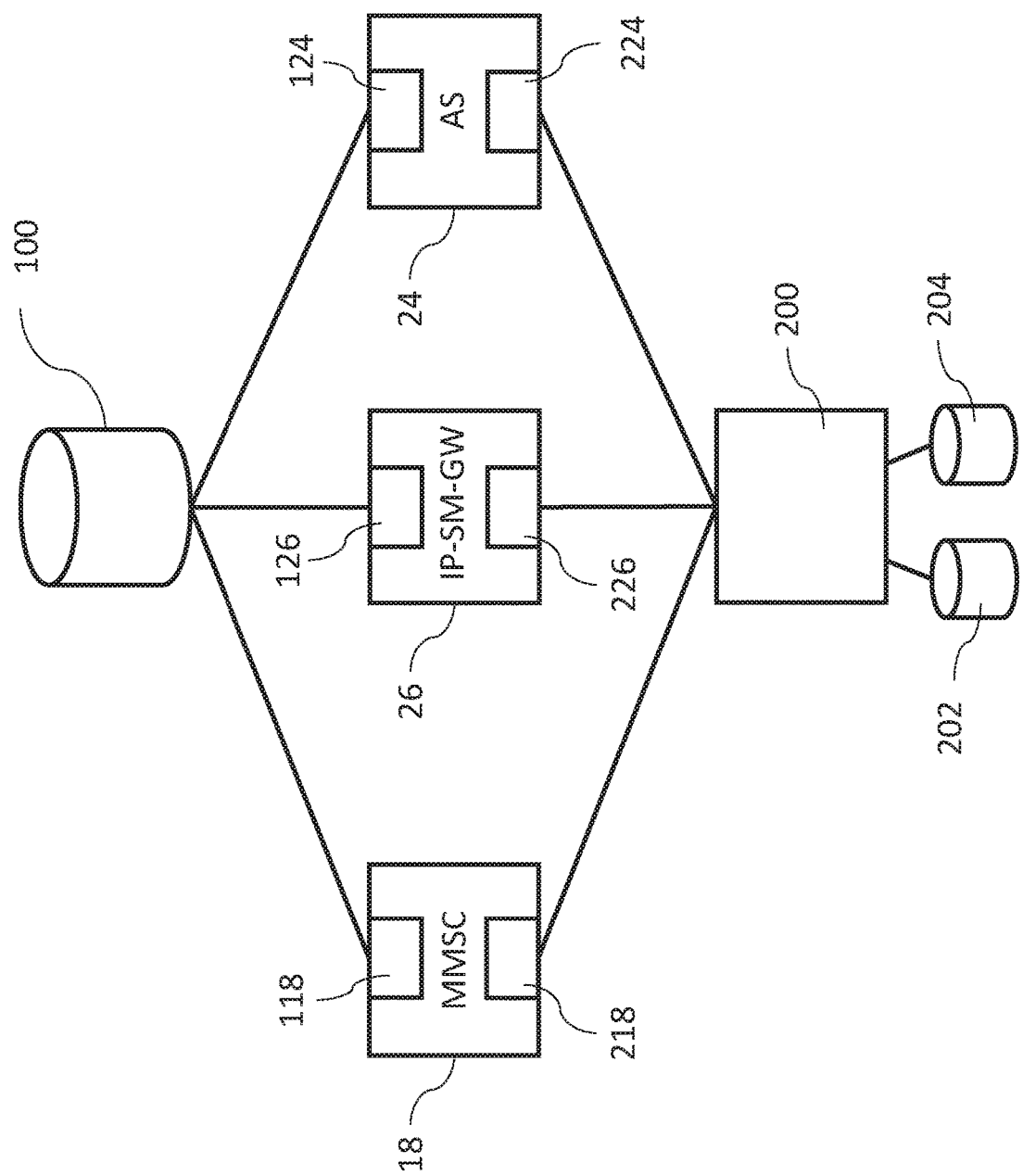
FIG. 2 shows a schematic block diagram representing another example of elements of a telephony network.

FIG. 2 shows an example of how telephony equipment in the telephony network 2 may be configured to implement methods in accordance with the present invention. The MMSC 18 includes an MMS identity management module 118 and an MMS-related out-of-band messaging module 218. The AS 24 includes a call identity management module 124 and a call-related out-of-band messaging module 224. The IP-SM-GW 26 includes an SMS identity management module 126 and an SMS-related out-of-band messaging module 226. In this example, each of the MMSC 18, the AS 24, and the IP-SM-GW 26 is connected to an identity management database 100. In other examples, the identity management database 100 may be replaced with separate databases included as part of each of the MMSC 18, the AS 24 and the IP-SM-GW 26, which in such cases may be communicatively coupled such that the IP-SM-GW 26 is able to access data stored in the separate databases. Each of the MMSC 118, the AS 24, and the IP-SM-GW 26 is also connected to an out-of-band messaging server 200, which is further connected to a message content and metadata database 202 and a message status database 204.

References herein to data being communicated via an "out-of-band" data connection with respect to given data are intended to cover the given data being transmitted over a link (for example a TCP/IP connection or a UDP link), which is different than an associated messaging service link, such as an SMS messaging link and an MMS messaging link, or an associated voice or video call link. An out-of-band data connection may be established during session setup and/or after a session is established over a messaging service link, or a voice call link. The data communicated over the out-of-band data connection may be correlated with data communicated in-band, with reference to for example a message ID or a call ID used to reference the respective message or call on the in-band link. The user equipment 12, 13 may establish an out-of-band data connection with the out-of-band messaging server 200 using an app installed on the user equipment.

In an example of a method for processing communications in the telephony network 2, the first telephony identifier $ID_A$ and the second telephony identifier $ID_B$ are configured for use as different destination addresses in different SMS messages sent to the second user equipment 13. During processing of at least one SMS message at the SMS processing equipment, identity management is performed in relation to the first telephony identifier $ID_A$ and the second telephony identifier $ID_B$.

In the example of FIG. 1, identity management is performed at the identity management module 126 of the IP-SM-GW 26, but in other examples, identity management may be performed by other SMS processing equipment, for example SMSC 20.

According to some examples of the method described above, performing identity management includes accessing group messaging indicator data indicative of an association between user of the first user equipment 12 and the user of second user equipment 13, and selecting the first telephony identifier $ID_A$ on the basis of the group messaging indicator data. In the example of FIG. 2, the stored data is stored in the identity management database 100. In some examples, the group messaging indicator data are configurable by users, for example by the user of first user equipment 12 or second user equipment 13. In some examples, such data are configurable by a user, for example by the user of the first user equipment 12. A user may configure such data via, for example a secure configuration web interface or a secure configuration app on a smartphone or tablet device.

In some examples, processing at least one SMS message at the SMS processing equipment includes receiving an SMS message from the second user equipment 13, selecting the first telephony identifier $ID_A$ on the basis of the group messaging indicator data, and transmitting an outgoing SMS message to the third user equipment 14 including an originating address comprising the first telephony identifier $ID_A$.

In an example, the group messaging indicator data includes the third telephony identifier $ID_C$, and selecting the first telephony identifier $ID_A$ includes deriving the third telephony identifier $ID_C$ from a destination address of the SMS message, and in response to the group messaging indicator data being indicative of an association between the first telephony identifier $ID_A$ and the third telephony identifier $ID_C$, selecting the first telephony identifier $ID_A$. In one example, the users of the first and second user equipment 12, 13 are each associated with a shared identity associated with a small business, and the shared identity is associated with the first telephony identifier $ID_A$. The user of the third user equipment 14 is a client of the small business, and accordingly when an SMS message arrives at the IP-SM-GW 26 from the second user equipment 13 with a destination address associated with third user equipment 14, the group messaging indicator data stored in the identity management database 100 indicates that there is an association between the telephony identifier $ID_A$ and the third telephony identifier $ID_C$, and the IP-SM-GW 26 selects the first telephony identifier $ID_A$, and the user equipment 14 perceives that the message was sent from the shared identity associated with the small business.

In an example, selecting the first telephony identifier $ID_A$ includes receiving selection data from the user of the second user equipment 13 on an out-of-band data connection, in association with the SMS message from the second user equipment 13. In response to the group messaging indicator data being indicative of an association between the first telephony identifier $ID_A$ and the selection data, the IP-SM-GW 26 selects the first telephony identifier.

In some examples, group messaging indicator data includes communication data relating to one or more previous communications involving use of the first telephony identifier $ID_A$ and the third telephony identifier $ID_C$. Previous communications may include one or more previous voice and/or video calls involving use of the first telephony identifier $ID_A$ and the third telephony identifier $ID_C$ as telephony party identifiers. In these examples, during the previous voice and/or video calls, the communication data is sent from the call identity management module 124 of the AS 24 to the identity management database 100, where the communication data is stored. Previous communications may also include one or more previous SMS messages including the second telephony identifier $ID_B$ and the third telephony identifier $ID_C$ as one of a destination address and an originating address, respectively. In these examples, on receipt of the previous SMS message, the communication data is sent from the SMS identity management module 126 of the IP-SM-GW 26 to the identity management database 100, where the communication data is stored. Previous communications may also include MMS messages including the first telephony identifier $ID_A$ and the third telephony identifier $ID_C$ as one of a destination address and an originating address, respectively. In these examples, on receipt of a previous MMS message, the communication data is sent from the MMS identity management module 118 of the MMSC 18 to the identity management database 100, where the communication data is stored.

In some examples of the present invention, message content and/or message metadata is derived from an SMS message sent from the second user equipment 13, and is transmitted to the first user equipment 12 using an out-of-band data connection. Referring to the example of FIG. 2, the out-of-band messaging server 200 transmits the message content and/or metadata to the first user equipment 12, such that the user of the first user equipment 12 receives the messages and/or associated metadata for which the first identifier $ID_A$ is selected. In the example of the first identity $ID_A$ being associated with an identity shared by members of a small business, business-related SMS messages sent by the user of the second user device 13 will be received by the user of the first user device 12, and the associated metadata will cause first user device 12 to order the messages correctly amongst any other received or sent messages which are associated with the same telephony identifier.

In some examples, the SMS processing equipment receives an indication of the SMS message having been subject to a status change from the third user equipment 14. In one example, the status change is indicated by a delivery receipt sent by the third user equipment 14 via SMS. In other examples, a status change is indicated by a message sent by the third user equipment 14 using an out-of-band data connection. In either case, a status change indicator is transmitted to the first user equipment 12 using an out-of-band data connection.

According to some examples of the present invention, processing at least one SMS message at the SMS processing equipment includes receiving an incoming SMS message including the first telephony identifier $ID_A$ as a destination address, and performing identity management includes delivering a copy of the incoming SMS message to the first user equipment 12 as a first outgoing SMS message, and further includes delivering a copy of the incoming SMS message to the second user equipment 13 as a second outgoing SMS message. In this way, an SMS sent with the first telephony identifier $ID_A$ as a destination address is transmitted to multiple users associated with the telephony identifier $ID_A$.

Some of the examples described further include receiving an indication of the second outgoing SMS message having been subject to a status change from the second user equipment 13, and transmitting a status change indicator relating to the first outgoing SMS message to the first user equipment 12 using an out-of-band data connection. In some of these examples, a status change from the second user equipment 13 is indicated by a read receipt sent by the second user equipment 13 using an out-of-band data connection. In this way, the user of the first user equipment 12 is made aware if the user of the second user equipment 13 has read the corresponding SMS. Similarly, some of the examples include receiving an indication of the first outgoing SMS message having been subject to a status change from the first user device 12, and transmitting a status change indicator relating to the second outgoing SMS message to the second user equipment 13 using an out-of-band data connection.

According to some examples of the present invention, the SMS processing equipment receives an SMS message from the second user equipment 13, selects to use the second telephony identifier $ID_B$ instead of the first telephony identifier $ID_A$, and transmits an outgoing SMS message including an originating address comprising the second telephony identifier $ID_B$. In this way, the second user equipment 13 may be used to send SMS messages independently of the shared identity. This may be useful, for example, if the user equipment 12 is associated with a business identity and also a personal identity, each identity being associated with a different telephony identifier, and only the business identity being a shared identity.

According to some examples, a fourth telephony identifier $ID_D$ is configured for communication with the first user equipment 12, and identity management is performed in relation to the use of the first and fourth telephony identifiers $ID_A$ and $ID_D$, during processing of an SMS message at the SMS processing equipment.

In some examples, users of the first and second user equipment 12 and 13 are in a predefined group including one or more additional users, wherein the users of the first and second user equipment 12 and 13 are selected from the predefined group for receipt of a group message in preference to at least one of the one or more additional users based on preference criteria. Examples of preference criteria include time-of-day, geolocation of user equipment with which users are associated, and an identity of a sender of a message addressed to the predefined group. In this way, the methods of the present invention can be applied with respect to sub-groups of the predefined group.

The above are to be understood as illustrative examples. Further examples are envisaged. For example, a user may have more identities and accordingly have one or more telephony identifiers, other than the first telephony identifier and the second telephony identifier, managed by one or more identity management systems as described above.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for processing communications in a telephony network, the method comprising:
   processing at least one SMS message in SMS processing equipment in the telephony network, wherein a first telephony identifier is associated with a first user and a second user, wherein a second telephony identifier is associated with the second user, and wherein each of the first and second telephony identifiers is useable as a destination address in an SMS message sent to the second user, wherein said processing the at least one SMS message in the SMS processing equipment comprises:
   receiving a mobile-originating SMS message from the second user; and
   transmitting an outgoing SMS message to a third user, the outgoing SMS message including an originating address comprising the first telephony identifier; and
   performing identity management, in relation to use of the first and second telephony identifiers for the second user, during said processing of the at least one SMS message at the SMS processing equipment, wherein said performing identity management comprises:
   accessing group messaging indicator data indicative of an association between the first user and the second user; and
   selecting the first telephony identifier on basis of the group messaging indicator data, wherein the group messaging indicator data comprises a third telephony identifier, the third telephony identifier being an identifier for the third user, wherein said selecting comprises deriving the third telephony identifier from the destination address of the mobile-originating SMS message and wherein said selecting is in response to the group messaging indicator data being indicative of an association between the first telephony identifier and the third telephony identifier.

2. The method of claim 1, wherein the telephony network comprises a circuit-switched core, a packet-switched core and gateway equipment connecting the circuit-switched core and the packet-switched core, the gateway equipment processing SMS messages transmitted between the packet-switched core and the circuit-switched core, and wherein the identity management is performed at the gateway equipment.

3. The method of claim 2, wherein the gateway equipment implements transport layer interworking for SMS messages transmitted between the circuit-switched core and the packet-switched core.

4. The method of claim 1, wherein the SMS processing equipment comprises an IP Short Message Gateway (IP-SM-GW).

5. The method of claim 1, wherein the first and second telephony identifiers are each MSISDNs.

6. The method of claim 1, wherein the group messaging indicator data comprise communication data relating to one or more previous communications involving use of the first telephony identifier and the third telephony identifier.

7. The method of claim 1, wherein said selecting comprises receiving selection data from the second user on an out-of-band data connection in association with the mobile-originating SMS message, and in response to the group messaging indicator data being indicative of an association between the first telephony identifier and the selection data, selecting the first telephony identifier.

8. The method of claim 1, comprising deriving message content and/or message metadata from the mobile-originating SMS message; and
   transmitting said message content and/or message metadata to the first user using an out-of-band data connection.

9. The method of claim 8, comprising receiving an indication of the SMS message having been subject to a status change from a user device associated with the third user; and
   transmitting a status change indicator to the first user using an out-of-band data connection.

10. The method of claim 1, wherein said processing the at least one SMS message at the SMS processing equipment comprises:
    receiving an incoming SMS message, the incoming SMS message comprising the first telephony identifier as a destination address; and wherein said performing said identity management comprises:
    delivering a copy of the incoming SMS message to the first user as a first outgoing SMS message; and
    delivering a copy of the incoming SMS message to the second user as a second outgoing SMS message.

11. The method of claim 10, comprising receiving an indication of the second outgoing SMS message having been subject to a status change from a user device associated with the second user; and
transmitting a status change indicator relating to the first outgoing SMS message to the first user using an out-of-band data connection.

12. The method of claim 10, comprising receiving an indication of the first outgoing SMS message having been subject to a status change from a user device associated with the first user; and
transmitting a status change indicator relating to the second outgoing SMS message to the second user using an out-of-band data connection.

13. The method of claim 1, comprising, at the SMS processing equipment:
receiving an SMS message from the second user;
selecting to use the second telephony identifier for the second user instead of the first telephony identifier; and
transmitting an outgoing SMS message, the outgoing SMS message including an originating address, the originating address comprising the second telephony identifier.

14. The method of claim 1, wherein a fourth telephony identifier is associated with the first user, and wherein the method comprises: performing identity management, in relation to use of the first and the fourth telephony identifiers for the first user, during processing of the at least one SMS message at the SMS processing equipment.

15. The method of claim 1, wherein said first and second users are in a predefined group comprising one or more additional users, and wherein the first and second users are selected from the predefined group for receipt of a group message in preference to at least one of the one or more additional users based on preference criteria.

16. The method of claim 15, wherein said preference criteria relate to one or more of time-of-day, geolocation of devices with which the first, second and one or more additional users are associated, and an identity of a sender of a message addressed to the predefined group.

17. An apparatus configured to perform a method for processing communications in a telephony network, the method comprising:
processing at least one SMS message in SMS processing equipment in the telephony network, wherein a first telephony identifier is associated with a first user and a second user, wherein a second telephony identifier is associated with the second user, and wherein each of the first and second telephony identifiers is useable as a destination address in an SMS message sent to the second user, wherein said processing the at least one SMS message in the SMS processing equipment comprises:
receiving a mobile-originating SMS message from the second user; and
transmitting an outgoing SMS message to a third user, the outgoing SMS message including an originating address comprising the first telephony identifier; and
performing identity management, in relation to use of the first and second telephony identifiers for the second user, during said processing of the at least one SMS message at the SMS processing equipment, wherein said performing identity management comprises:
accessing group messaging indicator data indicative of an association between the first user and the second user; and
selecting the first telephony identifier on basis of the group messaging indicator data, wherein the group messaging indicator data comprises a third telephony identifier, the third telephony identifier being an identifier for a third user, wherein said selecting comprises deriving the third telephony identifier from a destination address of the mobile-originating SMS message and wherein said selecting is in response to the group messaging indicator data being indicative of an association between the first telephony identifier and the third telephony identifier.

18. A non-transitory computer-readable storage medium storing instructions that, when executed by a processor, cause the processor to perform a method for processing communications in a telephony network, the method comprising:
processing at least one SMS message in SMS processing equipment in the telephony network, wherein a first telephony identifier is associated with a first user and a second user, wherein a second telephony identifier is associated with the second user, and wherein each of the first and second telephony identifiers is useable as a destination address in an SMS message sent to the second user, wherein said processing the at least one SMS message in the SMS processing equipment comprises:
receiving a mobile-originating SMS message from the second user; and
transmitting an outgoing SMS message to a third user, the outgoing SMS message including an originating address comprising the first telephony identifier; and
performing identity management, in relation to use of the first and second telephony identifiers for the second user, during said processing of the at least one SMS message at the SMS processing equipment, wherein said performing identity management comprises:
accessing group messaging indicator data indicative of an association between the first user and the second user; and
selecting the first telephony identifier on basis of the group messaging indicator data, wherein the group messaging indicator data comprises a third telephony identifier, the third telephony identifier being an identifier for a third user, wherein said selecting comprises deriving the third telephony identifier from a destination address of the mobile-originating SMS message and wherein said selecting is in response to the group messaging indicator data being indicative of an association between the first telephony identifier and the third telephony identifier.

* * * * *